May 2, 1950 G. A. ALVISET 2,506,188
OIL WELL SHOCK ABSORBER
Filed May 13, 1947
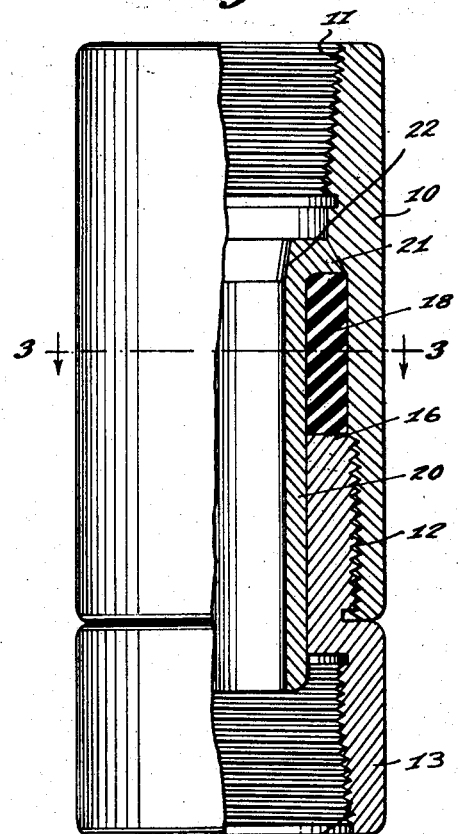
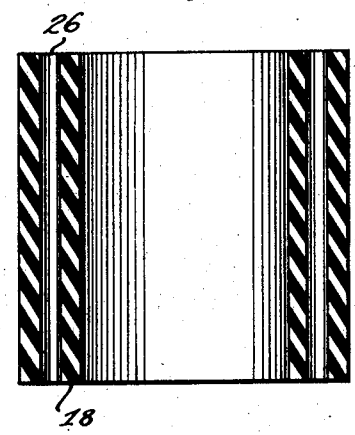
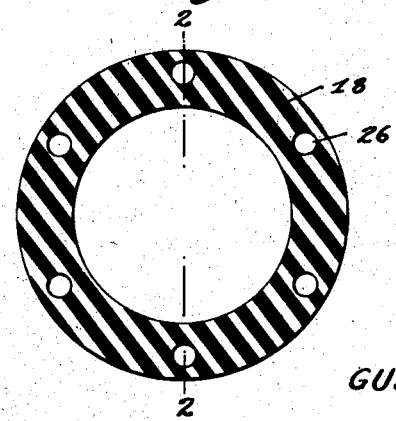
Inventor
GUSTAVE A. ALVISET Patented May 2, 1950

2,506,188

UNITED STATES PATENT OFFICE 2,506,188

OIL WELL SHOCK ABSORBER

Gustave A. Alviset, Houston, Tex.

Application May 13, 1947, Serial No. 747,793

1 Claim. (Cl. 251—167)

This invention relates to oil wells, and more particularly to a safety device for absorbing shocks of parting sucker rods due to unscrewing or breaking, and for absorbing the shock when the valves bump due to speeding up of the pumping units or expansion of the surface rods on a central power.

An oil pump is positioned at the bottom of the well tubing, and the pump is operated to pump the oil through the tubing up to the surface of the ground. The pump is operated by a string of vertical sucker rods hooked to a pumping unit or central power unit on the surface. The new and improved shock absorber replaces the seating shoe or seating nipple at the bottom of the pump.

The invention will be more readily understood by reference to the accompanying drawings, which illustrate a preferred embodiment of the invention.

Figure 1 is a view, partially in elevation and partially in section, of the shock absorber forming the subject matter of this invention.

Figure 2 is a vertical section through a rubber sleeve that constitutes the cushioning element of the shock absorber, along the line 2—2 of Figure 3.

Figure 3 is a horizontal section of the rubber sleeve, taken on the line 3—3 of Figure 1.

The shock absorber comprises a tubular body 10 that is threaded at its upper portion 11 so that it can be attached to the working barrel that contains the pump. The body portion 10 is also threaded at its lower portion 12 to receive a collar 13. The collar 13 has a threaded portion 14 adapted to receive the perforated nipple that is in contact with the oil.

The top portion of the collar 13 constitutes an internal ledge 16 and an annular rubber sleeve 18 is positioned on the ledge 16. A valve retainer 20 is adapted to be positioned within the body 10 and has a horizontal shoulder 21 that rests on the top of the rubber sleeve 18. The retainer 20 is provided with a taper 22 to receive the lower taper nut of the check or standing valve. The lower portion of the valve retainer 20 is of course free to slide relatively to the other elements of the assembly.

The rubber sleeve 18 contains a plurality of longitudinal holes 26, the size and the number depending on the characteristics of the rubber sleeve 18 and of the amount of shock absorbing movement that is desired.

The operation of the device is as follows:

The pump operates within the barrel positioned above the body 10. If a sucker rod breaks, it will fall, striking the check valve seated on the valve retainer 20. In accordance with the principles of the invention, the shock of the falling parts will be absorbed by the rubber sleeve 18, which is free to move downwardly against the top 16 of the collar 13. The holes 26 of the rubber sleeve 18 will be filled with oil from the well, and these oil-filled holes 26 will give a hydraulic checking action in addition to the absorption of the rubber itself. When the rubber sleeve 18 is compressed it acts as a snubber on the valve retainer 20.

It is often necessary to speed up the action of the pump in order to break up gas locks or to loosen up sand around various valves. This speeding action will cause the valves to vibrate and bump. When this happens, the shock is absorbed by the rubber sleeve 18.

What is claimed is:

In a shock absorber comprising a vertical hollow body with an internally tapered portion forming a valve seat at the upper end thereof and an internally threaded lower end, a collar having an externally threaded upper end fitting in the threaded lower end of the hollow body and forming an internal ledge upon the end thereof within said hollow body, and a hollow rubber sleeve in the latter upon said internal ledge, the features which include an internal tubular member extending slidably upward through said collar and through the rubber sleeve, the rubber sleeve having a series of longitudinal holes extending entirely therethrough, and an integral flange or shoulder upon the upper end of said internal tubular member extending over and enclosing said rubber sleeve, the flange or shoulder being externally tapered to fit into the internally tapered portion at the upper end of said hollow body, and said rubber sleeve being completely enclosed within and in contact with the upper external portion of said tubular member, with the under surface of the flange or shoulder thereon, with the internal ledge upon said collar, and with the intermediate portion of the interior of said hollow member.

GUSTAVE A. ALVISET.

REFERENCES CITED

The following references are of record in the file of this patent:

UNITED STATES PATENTS

| Number | Name | Date |
|---|---|---|
| 393,980 | Hill | Dec. 4, 1888 |
| 872,169 | Clayton | Nov. 26, 1907 |
| 1,067,384 | Thompson | July 15, 1913 |
| 2,367,033 | Lear | Jan. 9, 1945 |